May 19, 1925.
C. A. HULL
STEERING WHEEL MARKER
Filed Oct. 20, 1924
1,538,854
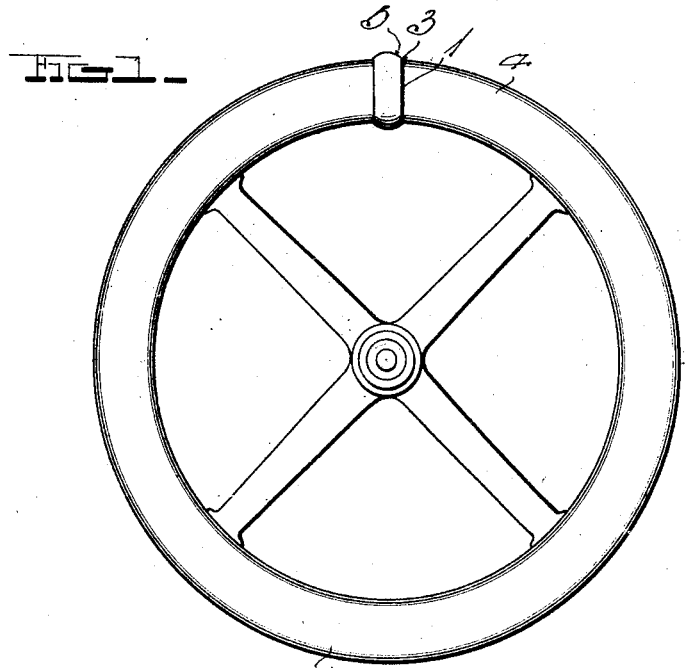
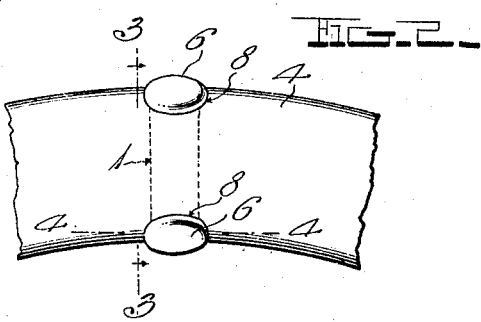
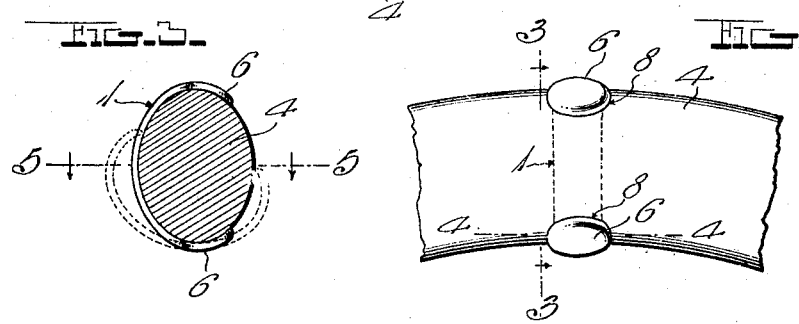
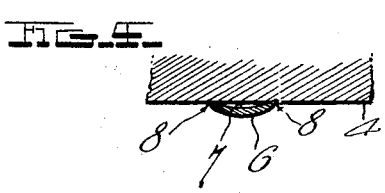
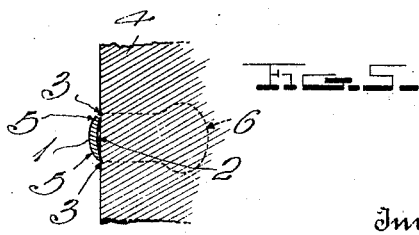
Witness
H. Woodard
Inventor
C. A. Hull
By H. B. Williamson & Co
Attorneys Patented May 19, 1925.

1,538,854

UNITED STATES PATENT OFFICE.

CHESTER A. HULL, OF PERU, INDIANA, ASSIGNOR TO THE IMPERIAL BRASS MANUFACTURING COMPANY, OF CHICAGO, ILLINOIS, A CORPORATION OF ILLINOIS.

STEERING-WHEEL MARKER.

Application filed October 20, 1924. Serial No. 744,734.

*To all whom it may concern:*

Be it known that I, CHESTER A. HULL, a citizen of the United States, residing at Peru, in the county of Miami and State of Indiana, have invented certain new and useful Improvements in Steering-Wheel Markers; and I do declare the following to be a full, clear, and exact description of the invention, such as will enable others skilled in the art to which it appertains to make and use the same.

My invention aims to provide a simple, inexpensive and desirable marking device adapted to be clipped around the rim of an automobile steering wheel, so that the driver may, by observing the position of the marker, determine the angle at which the front wheels of the machine are standing, this being often very advantageous, for instance, when moving into or out of restricted parking spaces.

With the foregoing in view, the invention resides in the novel subject matter hereinafter described and claimed, the description being supplemented by the accompanying drawing.

Figure 1 is a plan view showing the application of the invention.

Figure 2 is a fragmentary elevation looking in the opposite direction from Fig. 1.

Figures 3 and 4 are sectional views on lines 3—3 and 4—4 of Fig. 2.

Figure 5 is a sectional view on line 5—5 of Fig. 3.

In the drawing above briefly described, the numeral 1 designates a stiff, one-piece, spring metal clip of C-shape, the inner side of said clip being longitudinally channeled to some extent as indicated at 2, providing sharp edges 3 which are adapted to bite into the rim 4 of a steering wheel, so as to effectively hold the clip against sliding circumferentially of said rim. At its outer side, the clip 1 has its edges beveled as indicated at 5 so that the driver's hands cannot catch against the clip and have any tendency to dislocate it.

The arms of the clip are preferably formed with enlarged ends 6 simulating disks, these enlarged ends having concave inner sides 7 which provide additional biting edges 8 for engagement with the wheel. The outer sides of the disk-like clip ends 6 are preferably convex, as shown in the drawing.

By providing the unique construction shown and described, a steering wheel marker is provided which will tenaciously remain in the position in which it is placed upon a steering wheel rim so that by glancing at it, the angle at which the front wheels are standing can be readily determined, whenever occasion requires. Moreover, the device is of such construction that it may be easily applied to the wheel rim. This rim is usually elliptical in transverse section, and the greatest distance between the two arms of the clip 1, is about equivalent to the longest cross sectional diameter of the rim. The distance however, between the free ends of said arms, is preferably about the same as the shorter cross sectional diameter of the rim. Thus, the clip arms may be easily placed astride the rim as shown in dotted lines in Fig. 3, whereupon turning of the clip on the rim, will cause spreading of said arms and will eventually permit them to snap around the inner and outer peripheral portions of the rim. Shaping the clip in the manner specified, thus greatly facilitates its application to the rim of the wheel.

As excellent results are obtainable from the exact details disclosed, they are by preference followed, but within the scope of the invention as claimed, minor changes may be made.

I claim:

1. A steering wheel marker comprising a stiff one-piece C-shaped metal clip longitudinally channeled on its inner side to provide sharp edges adapted to bite into a wheel rim around which the device is sprung, the outer side of said clip being beveled at its edges to prevent the driver's hands from catching thereon and having a tendency to laterally displace the clip.

2. A structure as specified in claim 1; said clip having enlarged disk-like ends provided with concave sides disposed inwardly providing additional rim biting edges.

3. A steering wheel marker comprising a stiff one-piece C-shaped metal clip having enlarged disk-like ends provided with concave sides disposed inwardly, providing sharp edges adapted to bite into a wheel rim around which the clip is sprung, the outer side of said clip being beveled at its edges to prevent the driver's hands from catching thereon and having a tendency to laterally displace said clip.

In testimony whereof I have hereunto affixed my signature.

CHESTER A. HULL.